(12) United States Patent
Sugiyama

(10) Patent No.: US 7,471,853 B2
(45) Date of Patent: Dec. 30, 2008

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/698,202

(22) Filed: Jan. 26, 2007

(65) Prior Publication Data
US 2008/0056637 A1    Mar. 6, 2008

(30) Foreign Application Priority Data
Sep. 6, 2006    (JP) .............................. 2006-241227

(51) Int. Cl.
*G02F 1/035* (2006.01)
*G02F 1/295* (2006.01)
*G02F 1/03* (2006.01)
*G02F 1/07* (2006.01)

(52) U.S. Cl. ............... 385/3; 385/2; 385/8; 359/245

(58) Field of Classification Search ............. 385/2, 385/3, 8, 9, 40; 359/245, 254, 315
See application file for complete search history.

(56) References Cited

U.S. PATENT DOCUMENTS

| | | | |
|---|---|---|---|
| 6,961,166 B2* | 11/2005 | Wooten et al. | 359/245 |
| 7,054,512 B2* | 5/2006 | Sugiyama et al. | 385/9 |
| 7,155,072 B2* | 12/2006 | Sugiyama et al. | 385/2 |
| 7,177,490 B2* | 2/2007 | Sugiyama et al. | 385/9 |
| 7,212,326 B2* | 5/2007 | Wooten et al. | 359/245 |
| 7,286,727 B2* | 10/2007 | Sugiyama | 385/3 |
| 2004/0184755 A1* | 9/2004 | Sugiyama et al. | 385/129 |
| 2005/0175271 A1 | 8/2005 | Sugiyama et al. | |
| 2005/0213863 A1* | 9/2005 | Sugiyama et al. | 385/2 |

FOREIGN PATENT DOCUMENTS

| | | |
|---|---|---|
| JP | 09-197150 | 7/1997 |
| JP | 2005-221874 | 8/2005 |
| WO | 2004-068221 | 8/2004 |
| WO | WO 2004/068221 * | 8/2004 |

* cited by examiner

*Primary Examiner*—Kevin S Wood
*Assistant Examiner*—John M Bedtelyon
(74) *Attorney, Agent, or Firm*—Staas & Halsey LLP

(57) ABSTRACT

In an optical modulator according to the invention, with respect to two MZ type optical modulators connected to each other in tandem by a curved folded waveguide on an identical substrate, a longitudinal direction of an MZ type optical waveguide unit on an optical input port side is obliquely arranged to a longitudinal direction of an MZ type optical waveguide unit on an optical output port side, and a curvature radius of the curved folded waveguide is made larger than a half of an interval between the optical input/output ports to decrease a length of a feeder portion of a signal electrode corresponding to the MZ type optical waveguide unit on the input side. Therefore, a loss of an electric signal propagated through the signal electrode can be reduced.

28 Claims, 7 Drawing Sheets

ENLARGED DIAGRAM OF PORTION A

CASES OF FIRST AND SECOND EMBODIMENTS

CASE OF THIRD EMBODIMENT

OPTICAL MODULATOR

BACKGROUND OF THE INVENTION

1. Field of the Invention

The present invention relates to a waveguide type optical modulator used in optical communication, in particular, an optical modulator having a multistage configuration in which a plurality of optical modulators formed on an identical substrate are connected to each other.

2. Description of the Related Art

For example, an optical waveguide device using electrooptic crystal of lithium niobate ($LiNbO_3$), lithium tantalate ($LiTaO_2$), or the like is formed as follows. A structure obtained by forming a metal film on a part of a crystal substrate is thermally diffused, or patterned and then subjected to proton exchange in a benzoic acid to form an optical waveguide. Thereafter, electrodes are arranged near the optical waveguide. As one of the optical waveguide devices using electrooptic crystal, for example, an optical modulator or the like using a Mach-Zehnder (MZ) type optical waveguide is well known.

A general MZ type optical modulator includes: an optical waveguide consisting of an MZ interferometer constituting an input waveguide, a branching unit, a pair of branch waveguides, a coupler, and an output waveguide; and coplanar electrodes obtained by arranging a signal electrode and a ground electrode on the pair of branch waveguides. More specifically, for example, since a change in refraction index obtained by a z-direction electric field is used when a z-cut substrate is used, the signal electrode and the ground electrode are arranged immediately above the branch waveguides. Although the signal electrode and the ground electrode are patterned on the branch waveguides, respectively, in order to prevent light propagated in the branch waveguides from being absorbed by the signal electrode and the ground electrode, a dielectric layer (buffer layer) is arranged between the substrate and the signal electrode and the ground electrode. As the buffer layer, for example, a silicon oxide ($SiO_2$) film or the like having a thickness of 0.2 to 2 μm is used.

When the optical modulator is driven at a high speed, an output terminal of the signal electrode is grounded through a resistor to obtain a traveling-wave type electrode, and a high-frequency electric signal such as a microwave is applied from an input terminal of the signal electrode. At this time, refraction indexes of the branch waveguides are changed by an electric field generated between the signal electrode and the ground electrode to change a phase difference of lights propagating in the branch waveguides, whereby signal light modulated in intensity is outputted from the output waveguide. Furthermore, with respect to the optical modulator driven at a high speed, the following fact is known. That is, a sectional shape of the signal electrode is changed to control an effective refraction index, and propagation speeds of the light and the electric signal are matched with each other, so that wide-band optical response characteristics are achieved.

Furthermore, the following optical modulator is also known. That is, two MZ type optical modulators are connected to each other in tandem, an electric signal corresponding to a clock is applied to a signal electrode of one MZ type optical modulator, and an electric signal corresponding to NRZ (Non-Return to Zero) data is applied to a signal electrode of the other MZ type optical modulator, so that an optical signal of an RZ (Return to Zero) modulation method can be generated. In the optical modulator of the RZ modulation method, since two MZ type optical modulators are arranged in series with each other in a propagating direction, the length of a chip is twice that of an optical modulator of an NRZ modulation method using one MZ type optical modulator. Furthermore, although a drive voltage decreases when an interaction length increases, since an interaction length in an optical modulator of the RZ modulation method is limited by a chip size, there is a problem in that the drive voltage cannot be easily reduced.

Therefore, the present applicant proposes the following configuration. That is, two MZ type optical modulators are arranged in parallel, and the two MZ type modulators are connected to each other by using a curved folded waveguide (for example, see WO 2004/068221). More specifically, as shown in FIG. 11, two MZ type optical waveguide units 120A and 120B are arranged on in parallel to each other on an identical substrate (chip) 110, one terminals of the MZ type optical waveguide units 120A and 120B are located on the same end face of the substrate 110, and the other terminals are connected to each other through a curved folded waveguide 121. Coplanar electrodes are patterned in association with the MZ type optical waveguide units 120A and 120B. In this case, to one terminal of the MZ type optical waveguide unit 120A located at the lower left of a signal electrode 131A in FIG. 11, an electric signal CLK having a clock waveform indicated by the first stage in FIG. 12 is applied. To one terminal of the MZ type optical waveguide unit 120B located at the lower right of a signal electrode 131B in FIG. 11, an electric signal DATA having NRZ data as indicated by the second stage in FIG. 12 is applied. In this manner, incident light Lin is propagated through the MZ type optical waveguide unit 120A on the input side to obtain a light signal La having a waveform as shown in the third stage in FIG. 12. Furthermore, the light signal La is propagated through the curved folded waveguide 121 and the MZ type optical waveguide unit 120B on the output side to obtain a RZ-modulated light signal Lout having a waveform as indicated by the fourth stage in FIG. 12.

In relation to the configuration using the curved folded waveguide as shown in FIG. 11, a configuration in which a curved folded waveguide is applied to a central portion of a pair of branch waveguides in one MZ type optical modulator is also proposed (for example, see Japanese Patent Application Laid-Open No. 2005-221874).

In the optical modulator having the conventional configuration as shown in FIG. 11, the curved folded waveguide 121 has a loss which increases when the radius of the curved folded waveguide 121 decreases. For this reason, the curved folded waveguide 121 requires a radius of 2 mm or more in general. Two input connectors to supply electric signals to the signal electrodes 131A and 131B of the two MZ type optical modulators must be arranged near one side surface (side surface on the lower side in FIG. 11) of the substrate 110 to make it easy to package the input connector. For this reason, a feeder part which guides an electric signal to a signal electrode (signal electrode 131B in FIG. 11) of the MZ type optical modulator which is farther from the input connector becomes long to disadvantageously increase a loss of the electric signal. Furthermore, a chip length decreases because the two MZ type optical modulators are arranged in parallel to each other. However, a chip width is not easily made smaller than a predetermined width because the chip width is restricted by the radius or the like of the curved folded waveguide 121. For this reason, the number of chips obtained from one wafer is disadvantageously limited to a specific number.

SUMMARY OF THE INVENTION

The present invention has been made in consideration of the above points, and an object thereof is to provide an optical modulator in which a loss of an electric signal propagated through a signal electrode can be reduced in a configuration obtained by connecting two optical modulators formed on an identical substrate through a curved folded waveguide and which can obtain a large number of chips from one wafer.

In order to achieve the above-described object, the present invention provides an optical modulator comprising: a substrate having an electrooptic effect; an optical input port and an optical output port arranged on the same end face of the substrate; a first optical waveguide unit formed on the substrate and having one end connected to the optical input port; a second optical waveguide unit formed on the substrate and having one end connected to the optical output port; a curved folded waveguide which is formed on the substrate and connects the other ends of the first and second optical waveguide units to each other; a first signal electrode arranged along the first optical waveguide unit; a second signal electrode arranged along the second optical waveguide unit; and a ground electrode arranged with a distance to the first and second signal electrodes. In this optical modulator, a longitudinal direction of the first optical waveguide unit is obliquely arranged to a longitudinal direction of the second optical waveguide unit; a curvature radius of the curved folded waveguide is larger than a half of an interval between the optical input port and the optical output port; and input portions of the first and second signal electrodes to which electric signals are applied are arranged near a side surface, close to the optical output port, of opposing side surfaces of the substrate.

In the optical modulator having the above configuration, the first optical waveguide unit on the optical input port side is obliquely arranged to the second optical waveguide unit on the optical output port side, and a curvature radius of the curved folded waveguide is made larger than a half of an interval between the optical input/output ports, so that the length of a feeder portion extending from an input part of the first signal electrode corresponding to the first optical waveguide unit is made shorter than that in the conventional configuration described above while arranging input units of the first and second signal electrodes near a side surface of the substrate closer to the optical output port.

As an aspect of the optical modulator, for example, the shape of the substrate may be rectangle, and a distance between from a side surface of opposite side surfaces of the substrate, the side surface being closer to the optical output port, to the optical input port may be shorter than a distance between from the other side surface of the opposite side surfaces of the substrate to the optical input port. In addition, as another aspect, the substrate may have a trapezoidal shape such that a given end face on which the optical input port and the optical output port are located is almost parallel to an end face opposing the end face, and an angle formed by the end faces and the side surface closer to the optical input port is almost 90°. The substrate has the trapezoidal shape to make it possible to reduce the substrate in area.

According to the optical modulator of the present invention, the feeder portion of the first signal electrode is shortened to make it possible to reduce a loss of an electric signal on the first signal electrode. When the substrate shape is trapezoidal, the number of chips which can be obtained from one wafer can be increased.

Other objects, characteristics, and advantages of the present invention will be apparent from the following explanation about embodiments related to the accompanying drawings.

DESCRIPTION OF THE PREFERRED EMBODIMENTS

Figure 1:
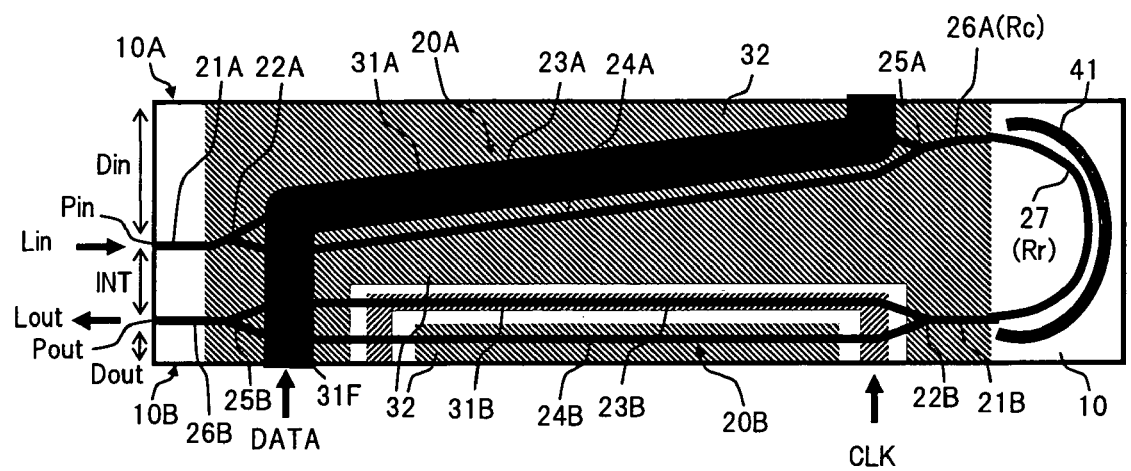
FIG. 1 is a plan view showing a configuration an optical modulator according to a first embodiment of the present invention.

A best mode for carrying out the present invention will be described below with reference to the accompanying drawings. The same reference numerals as in all the drawings denote the same or similar parts in the drawings.

FIG. 1 is a plan view showing the configuration of an optical modulator according to a first embodiment of the present invention.

In FIG. 1, the optical modulator according to the embodiment includes, for example, a substrate (chip) 10 having an electrooptic effect, two Mach Zehnder (MZ) type optical waveguide units 20A and 20B formed on the substrate 10, signal electrodes 31A and 31B formed on a surface of the substrate 10 in association with the Mach Zehnder (MZ) type optical waveguide units 20A and 20B, and a ground electrode 32.

As the substrate 10, for example, a crystal substrate consisting of z-cut lithium niobate ($LiNbO_3$) or lithium tantalate ($LiTaO_2$) is used. The substrate used in the present invention is not limited to the example described above. The present invention is effective for a known substrate material having an electrooptic effect.

The MZ type optical waveguide units 20A and 20B have, for example, input waveguides 21A and 21B, branch portions 22A and 22B, branch waveguides 23A, 24A, 23B, and 24B, coupling units 25A and 25B, and output waveguides 26A and 26B, respectively. The MZ type optical waveguide units 20A and 20B are formed near a surface of the substrate 10 by performing processing such as thermal diffusion or proton exchange of titanium (Ti) or the like to the substrate 10. One terminal (optical input port Pin) of the input waveguide 21A of the MZ type optical waveguide unit 20A on the upper side in FIG. 1 and one terminal (optical output port Pout) of the output waveguide 26B of the MZ type optical waveguide unit 20B on the lower side in FIG. 1 are located at the same end face of the substrate 10 on the left side in FIG. 1. The output waveguide 26A of the MZ type optical waveguide unit 20A and the input waveguide 21B of the MZ type optical waveguide unit 20B, the output/input waveguides 26A and 21B located on the opposite side of the optical input/output ports, are connected to each other through a curved folded waveguide 27, and the two MZ type optical waveguide units 20A and 20B are connected to each other in tandem. In addition, a longitudinal direction of the MZ type optical waveguide unit 20B on the output side is obliquely arranged to a longitudinal direction of the MZ type optical waveguide unit 20A on the input side. The positions of the optical input port Pin and the optical output port Pout are made close to a side surface 10B side, near the optical output port Pout, of the opposite side surfaces 10A and 10B along the longitudinal direction of the substrate 10. More specifically, a distance from the side surface 10B which is close to the optical output port Pout of the substrate 10 to the optical output port Pout is defined as Dout, and a distance from the other side surface 10A of the substrate 10 to the optical input port Pin is defined as Din. In this case, an arrangement pattern of the MZ type optical waveguide units 20A and 20B in the substrate 10 is determined such that the distance Dout on the output side is shorter than the distance Din on the input side (Dout<Din).

In the arrangement pattern, the input waveguide 21A of the MZ type optical waveguide unit 20A and the output waveguide 26B of the MZ type optical waveguide unit 20B are preferably arranged in almost parallel to each other in consideration of connection to an external optical fiber or the like. More specifically, in this embodiment, pattern design is made such that the input waveguide 21A is curved near the branch portion 22A to make the input waveguide 21A and the output waveguide 26B substantially parallel to each other.

Figure 2:
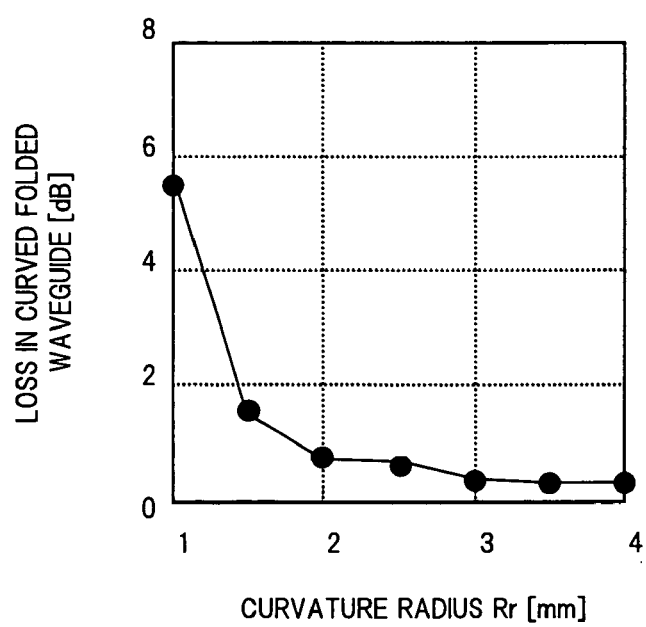
FIG. 2 is a diagram showing an example of a relationship between a loss and a curvature radius of a curved folded waveguide.

It is assumed that the curved folded waveguide 27 has a curvature radius Rr larger than a half of an interval INT between the optical input port Pin and the optical output port Pout. In the curved folded waveguide 27, for example, as shown in FIG. 2, when the curvature radius Rr becomes smaller than 1.5 mm, a loss considerably increases. In order to suppress the increase in loss, an interval between the output waveguide 26A of the MZ type optical waveguide unit 20A and the input waveguide 21B of the MZ type optical waveguide unit 20B may be increased to make the curvature radius Rr 1.5 mm or more. Even though the output waveguide 26A of the MZ type optical waveguide unit 20A is curved at a curvature radius Rc larger than the curvature radius Rr of the curved folded waveguide 27 to make a bending angle of the curved folded waveguide 27 180° or less, the loss can be effectively suppressed from increasing. Furthermore, a groove 41 is formed in a radially outside part of the substrate 10 along the curved folded waveguide 27 to strongly confine light in the curved folded waveguide 27, so that the loss can also be suppressed from increasing. When the groove 41 is formed, the curvature radius Rr of the curved folded waveguide 27 can be more reduced. For this reason, the optical modulator can be designed to be reduced in size. The groove 41 may be formed as needed, and can also be omitted.

The signal electrode 31A corresponding to the MZ type optical waveguide unit 20A is patterned such that an end portion on the input waveguide 21A side is located on the side surface 10B of the substrate 10, an end portion on the output waveguide 26A side is located on the side surface 10A of the substrate 10, and a central portion is along the upper side of one branch waveguide 23A. The signal electrode 31B corresponding to the MZ type optical waveguide unit 20B is patterned such that both the end portions are located on the side surface 10B of the substrate 10, and the central portion is along the upper side of one branch waveguide 23B. The ground electrode 32 is arranged at a predetermined interval with respect to the signal electrodes 31A and 31B. The signal electrode 31A serves as a traveling-wave electrode by grounding the end portion on the output waveguide 26A side through a resistor (not shown). In this case, for example, an electric signal DATA corresponding to NRZ data is applied to the end portion of the signal electrode 31A on the input waveguide 21A side. The signal electrode 31B serves as a traveling-wave electrode by grounding the end portion on the output waveguide 26B side through a resistor (not shown). In this case, for example, an electric signal CLK corresponding to a clock is applied to the end portion of the signal electrode 31B on the input waveguide 21B side.

Buffer layers (not shown) obtained by using $SiO_2$ or the like are formed between the signal electrodes 31A and 31B, the ground electrode 32, and the surface of the substrate 10 to prevent light propagated through the MZ type optical waveguide units 20A and 20B from being absorbed by the respective electrodes.

An operation of the optical modulator according to the first embodiment will be described below.

In the optical modulator having the above configuration, external light Lin given to the optical input port Pin is propagated through the input waveguide 21A of the MZ type optical waveguide unit 20A and branched by the branch portion 22A, and the branched lights are sent to the branch waveguides 23A and 24A, respectively. An electric field generated between the signal electrode 31A and the ground electrode 32 depending on the electric signal DATA traveling through the signal electrode 31A is applied to the branch waveguides 23A and 24A. The electrooptic effect obtained by the electric field changes refractive indexes of the branch waveguides 23A and 24A. In this manner, the phases of lights propagated through the branch waveguides 23A and 24A change.

Figure 11:
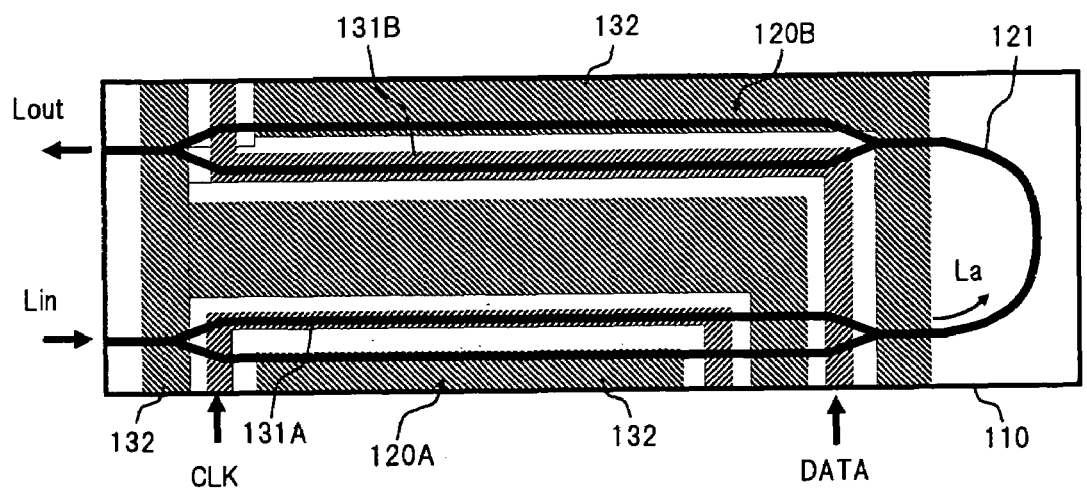
FIG. 11 is a plan view showing a configuration of a conventional optical modulator in which two MZ type optical modulators are connected to each other in tandem.
Figure 12:
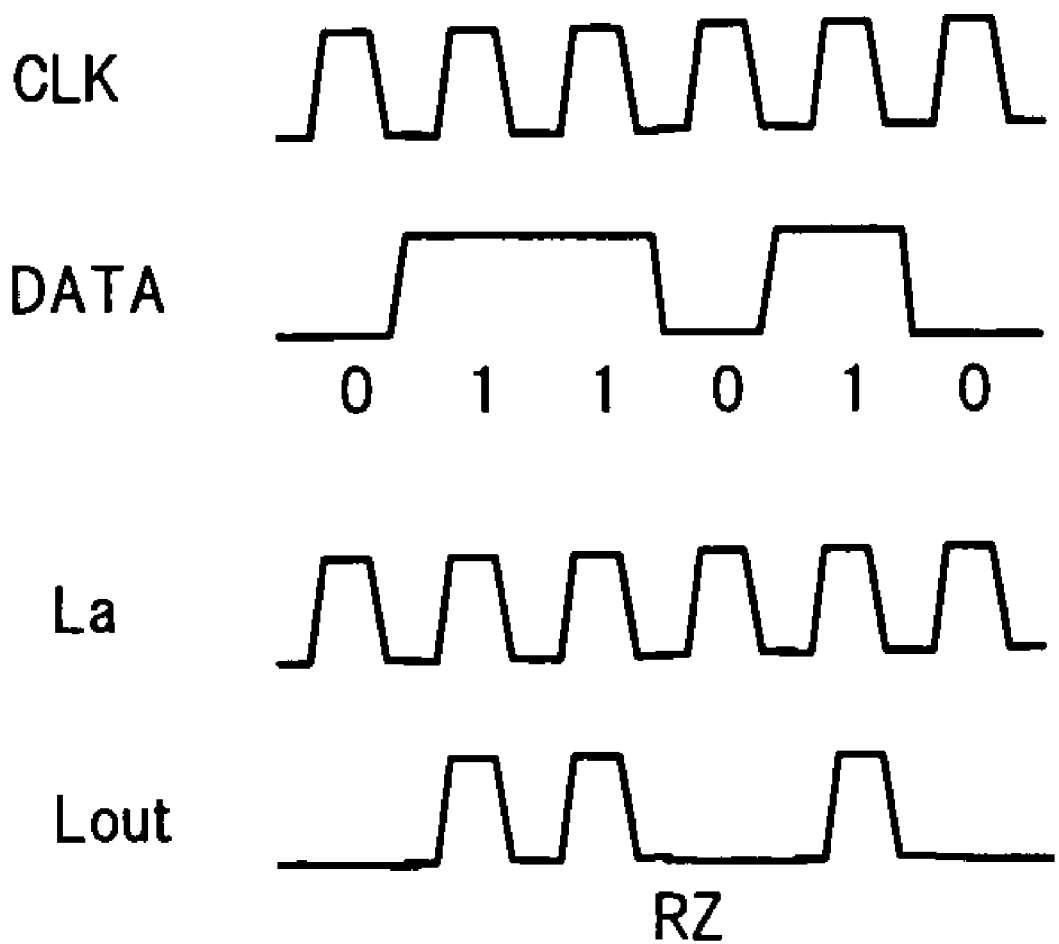
FIG. 12 is a waveform chart illustrating waveforms of electric signals and light signals in the conventional optical modulator.

At this time, the MZ type optical waveguide unit 20A on the input side is obliquely arranged to the MZ type optical waveguide unit 20B on the output side, and the positions of the input waveguide 21A and the output waveguide 26B are made close to the side surface 10B of the substrate 10 to make a length of a feeder portion 31F (portion extending from an input terminal of the electric signal DATA to the branch waveguide 23A) shorter than that obtained when two MZ type optical waveguide units are parallel to each other as in a conventional configuration shown in FIG. 11. In this manner, a loss of the electric signal DATA propagated through the signal electrode 31A is smaller than that in the conventional configuration.

The lights propagated through the branch waveguides 23A and 24A of the MZ type optical waveguide unit 20A and modulated in phase are coupled by the coupling unit 25A to output a light signal which is modulated in intensity according to NRZ data from the output waveguide 26A. The light signal is transmitted to the input waveguide 21B of the MZ type optical waveguide unit 20B through the curved folded waveguide 27.

The light signal given to the input waveguide 21B is branched into two signals by the branch portion 22B, and the two signals are transmitted to the branch waveguides 23B and 24B, respectively. An electric field generated between the signal electrode 31B and the ground electrode 32 depending on the electric signal CLK traveling through the signal electrode 31B is applied to the branch waveguides 23B and 24B, and an electrooptic effect obtained by the electric field changes the refractive indexes of the branch waveguides 23B and 24B. In this manner, the lights propagated through the branch waveguides 23B and 24B change in phase. When the lights modulated in phase are coupled by the coupling unit 25B, a light signal Lout RZ-modulated is output from the output waveguide 26B.

As described above, according to the optical modulator of the first embodiment, the MZ type optical waveguide unit 20A on the input side is obliquely arranged to the MZ type optical waveguide unit 20B on the output side, so that the length of the feeder portion 31F of the signal electrode 31A becomes short. For this reason, a loss of the electric signal DATA in the signal electrode 31A can be reduced. Since the input portion to which the electric signal DATA of the signal electrode 31A is applied is arranged near the side surface 10B of the substrate 10 located on the same side as that of the input portion to which the electric signal CLK of the signal electrode 31B is applied, the input connectors for the electric signals DATA and CLK can be arranged on one side of a package (not shown) in which the substrate 10 is accommodated, and an occupied area of the optical modulator in packaging can be reduced. Furthermore, the curvature radius Rr of the curved folded waveguide 27 is made 1.5 mm or more, and the output waveguide 26A of the MZ type optical waveguide unit 20A is curved at the curvature radius Rc larger than the curvature radius Rr, so that a loss of a light signal propagated through the curved folded waveguide 27 can be suppressed. In addition, when the groove 41 is formed on an outside of the curved folded waveguide 27 in a radial direction, light is strongly confined by the curved folded waveguide 27. For this reason, the curvature radius Rr can also be reduced while suppressing an increase in loss.

A second embodiment of the present invention will be described below.

Figure 3:
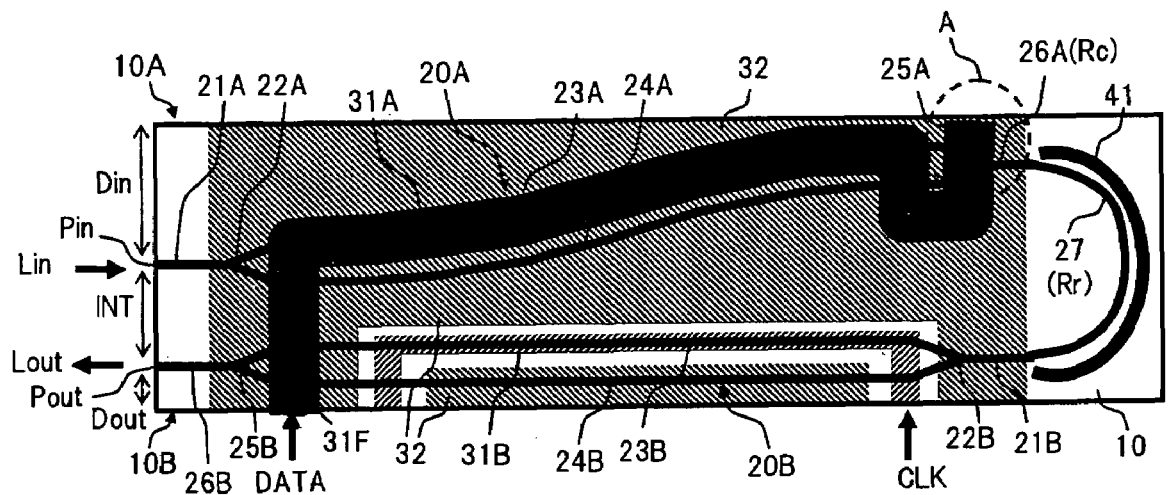
FIG. 3 is a plan view showing a configuration of an optical modulator according to a second embodiment of the present invention.

FIG. 3 is a plan view showing a configuration of an optical modulator according to the second embodiment of the present invention.

In FIG. 3, the optical modulator according to the embodiment is obtained such that, in the configuration of the first embodiment shown in FIG. 1, the shape of the MZ type optical waveguide unit 20A on the input side is changed into an S shape, and the pattern of the terminal portion of the signal electrode 31A located near the side surface 10A of the substrate 10 is changed. Since the configurations other than the shape of the MZ type optical waveguide unit 20A and the pattern of the signal electrode 31A are the same as those in the first embodiment, a description thereof will be omitted.

The first embodiment shows an example in which the output waveguide 26A of the MZ type optical waveguide unit 20A is curved at the curvature radius Rc larger than the curvature radius Rr of the curved folded waveguide 27 to make the bending angle of the curved folded waveguide 27 180° or less. However, the curvature radius Rc may not be able to be sufficiently increased due to limitations of a chip size and the like. In such a case, as shown in FIG. 3, it is effective that the entire shape of the MZ type optical waveguide unit 20A is an S shape.

When the MZ type optical waveguide unit 20A has the S shape, an output-side portion of the MZ type optical waveguide unit 20A becomes close to the side surface 10A of the substrate 10. For this reason, a bonding pad to connect a terminal resistor to an end portion of the signal electrode 31A becomes short. In order to avoid this, according to the embodiment, before the bonding pad on the terminal side on the signal electrode 31A, an electrode pattern is drawn in a U shape to assure a desired pad length.

Figure 4:
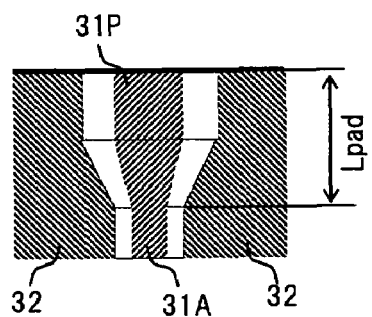
FIG. 4 is an enlarged view showing a concrete example of a bonding pad according to the second embodiment.

More specifically, with respect to the bonding pad, as shown in FIG. 4 obtained by enlarging a part A surrounded by a broken line in FIG. 3, the end portion of the signal electrode 31A drawn in the U shape is increased in width, and a pad length Lpad corresponding to the length of the extended portion is preferably set at, for example, 50 μm or more.

According to the optical modulator having the above configuration, the same effect as that described in the first embodiment can be obtained. Even though the optical modulator is limited in a chip size and the like, the MZ type optical waveguide unit 20A is formed in an S shape to make it possible to suppress a loss of an optical signal in the curved folded waveguide 27 from increasing. Furthermore, even though the S-shaped MZ type optical waveguide unit 20A is used, a sufficient pad length can be assured near the side surface 10A of the substrate 10 for a bonding pad of the signal electrode 31A. For this reason, a terminal process of the signal electrode 31A can be easily and reliably performed.

A third embodiment of the present invention will be described below.

Figure 5:
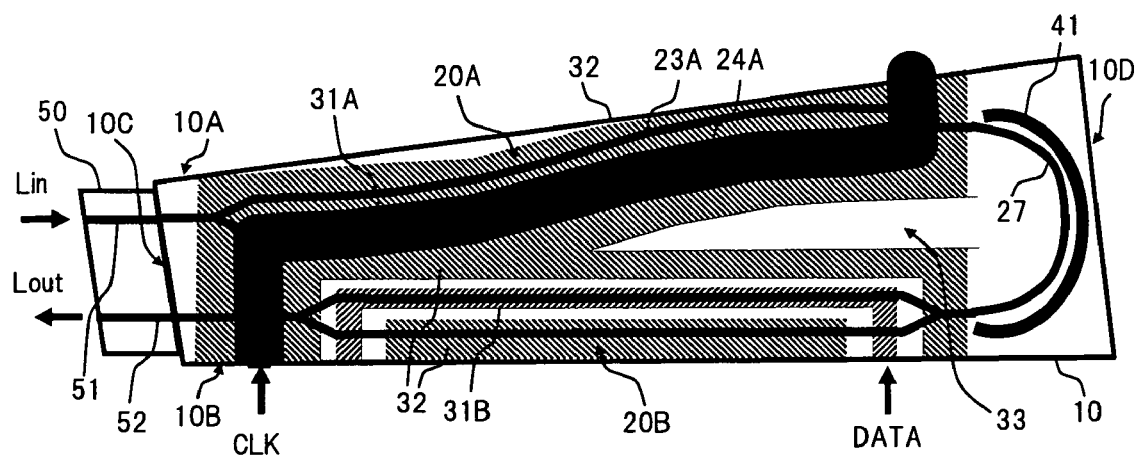
FIG. 5 is a plan view showing a configuration of an optical modulator according to the third embodiment.

FIG. 5 is a plan view showing a configuration of an optical modulator according to the third embodiment of the present invention.

In FIG. 5, the optical modulator according to this embodiment is obtained such that, in the configuration of the second embodiment shown in FIG. 3, the shape of the substrate 10 is changed into a trapezoidal shape by using a shape designed to have a distance between the two MZ type optical waveguide units 20A and 20B which is smaller on an input/output port side than on a curved folded waveguide 27 side. More specifically, the substrate 10 is preferably cut to satisfy the following conditions. That is, opposite end faces 10C and 10D of the substrate 10 located on the light and left in FIG. 5 are almost parallel to each other, and an angle between the opposite end faces 10C and 10D and the side surface 10A located on the upper side in FIG. 5 is almost 90°.

When the substrate 10 is formed in the trapezoidal shape, a space enough to arrange an electrode between the MZ type optical waveguide unit 20A and the side surface 10A of the substrate 10 cannot be easily assured. In this case, a signal electrode 31A is arranged on a branch waveguide 24A, located inside the substrate 10, of a pair of branch waveguides 23A and 24A. FIG. 5 shows an example in which an electric signal CLK corresponding to a clock is applied to the signal electrode 31A on the input side and an electric signal DATA corresponding to NRZ data is applied to the signal electrode 31B on the output side. However, as in the first and second embodiments, the electric signal DATA may be applied to the signal electrode 31A on the input side, and the electric signal CLK is applied to the signal electrode 31B on the output side, as a matter of course.

When the substrate 10 is formed in the trapezoidal shape, the widths of a ground electrode 32 corresponding to the MZ type optical waveguide units 20A and 20B are different from each other. For example, when an environmental temperature changes, stress is generated by a difference in thermal expansion between the ground electrode 32 and the substrate 10, and the stress is enhanced in one MZ type optical modulator. As a result, the voltage may shift to a voltage at which optical outputs of the MZ type optical modulators on the input and output sides become zero. In order to prevent characteristics from being deteriorated by the change in temperature, in the embodiment, in a region 33 located near the curved folded waveguide 27 between the MZ type optical waveguide units 20A and 20B, the ground electrode 32 is divided into two electrodes such that the widths of the divided ground electrodes 32 corresponding to the MZ type optical waveguide units 20A and 20B are almost equal to each other.

In addition, in the optical modulator according to the embodiment, since an interval between the optical input/output ports is smaller than that in the conventional configuration shown in FIG. 11, a two-core fiber array 50 is used for external connection. In the two-core fiber array 50, for example, a constant-polarization fiber 51 is desirably used as the optical fiber on the input side, and an inexpensive single-mode fiber 52 is desirably used as an optical fiber on the output side.

Figure 6:
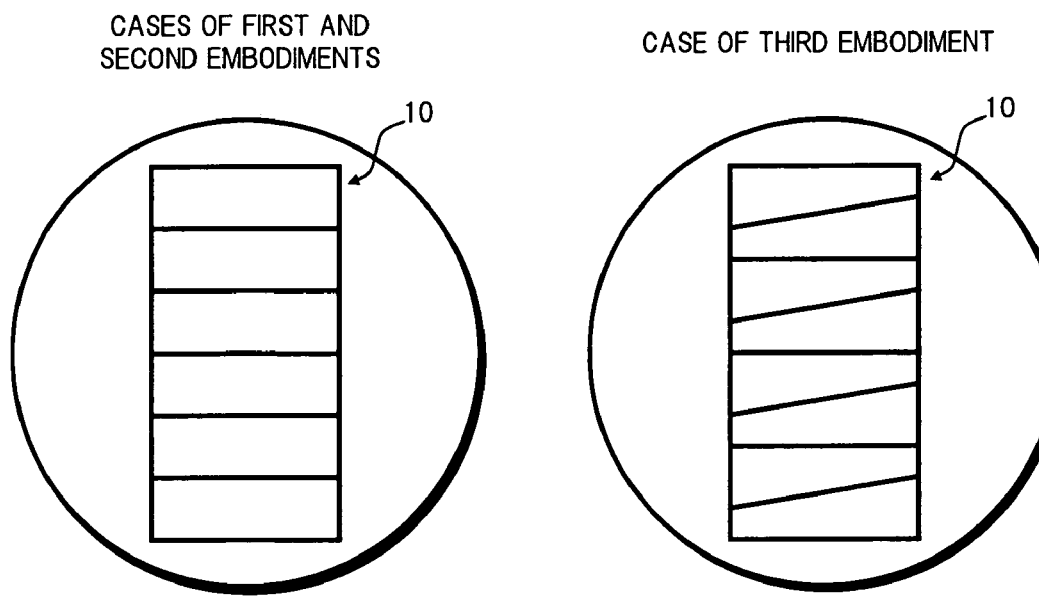
FIG. 6 is a diagram for explaining the number of chips which can be obtained from one wafer according to the third embodiment.

In the optical modulator having the above configuration, since the area of the substrate 10 can be reduced by forming the substrate 10 in the trapezoidal shape, the number of chips which can be obtained from one wafer can be increased. More specifically, for example, as shown in FIG. 6, it is assumed that six chips can be obtained from one wafer when the substrate 10 is formed in the rectangular shape as in the first and second embodiment. In this case, when the substrate 10 is formed in the trapezoidal shape, eight chips can be obtained from one wafer. With respect to the chip arrangement on the wafer, a method of manufacturing a tapered waveguide chip is disclosed in Japanese Patent Application Laid-Open No. 9-197150.

In this optical modulator, end faces of an optical input port Pin and an optical output port Pout are obliquely cut. For this reason, for example, a defect in which light reflected by an end face of the optical input port Pin returns to a light source (not shown) connected to the constant-polarization fiber 51 on the input side to deteriorate characteristics can be prevented. Note, the end faces may be obliquely cut toward the upper left or the upper right in FIG. 5. In the configuration of the optical modulator, since the MZ type optical waveguide unit 20A is arranged closer to an end face 10C than the MZ type optical waveguide unit 20B, the substrate 10 is desirably cut such that an angle between the end face 10C and the side surface 10B is larger than 90° to make the substrate on the MZ type optical waveguide unit 20A side, i.e., the optical input port Pin side long.

Furthermore, in the region 33 located near the curved folded waveguide 27 between the MZ type optical waveguide units 20A and 20B, the widths of the ground electrode 32 corresponding to the MZ type optical waveguide units 20A and 20B are made equal to each other to make it possible to prevent characteristics from being deteriorated by the shift in voltage in the change in temperature.

Figure 7:
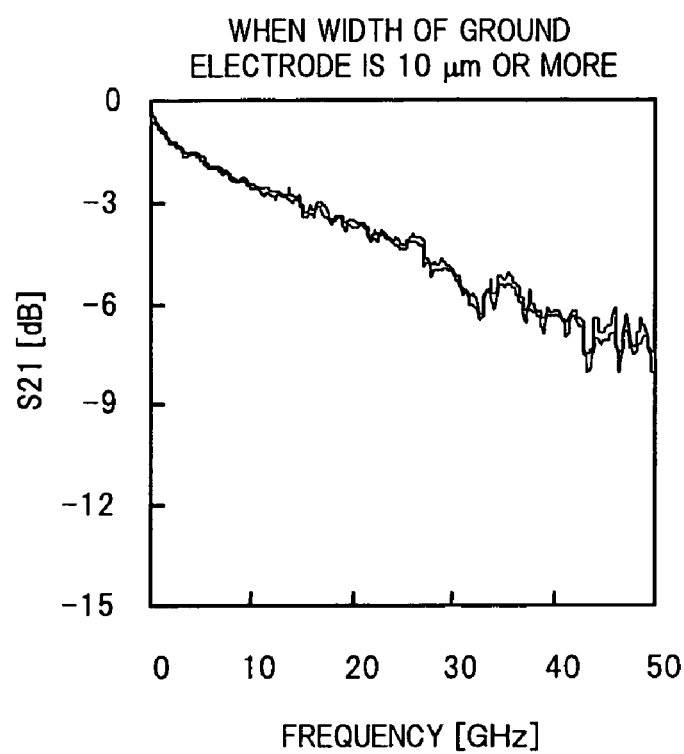
FIG. 7 is a diagram showing a manner of deterioration of frequency characteristics caused by a width of a ground electrode according to the third embodiment.
Figure 7:
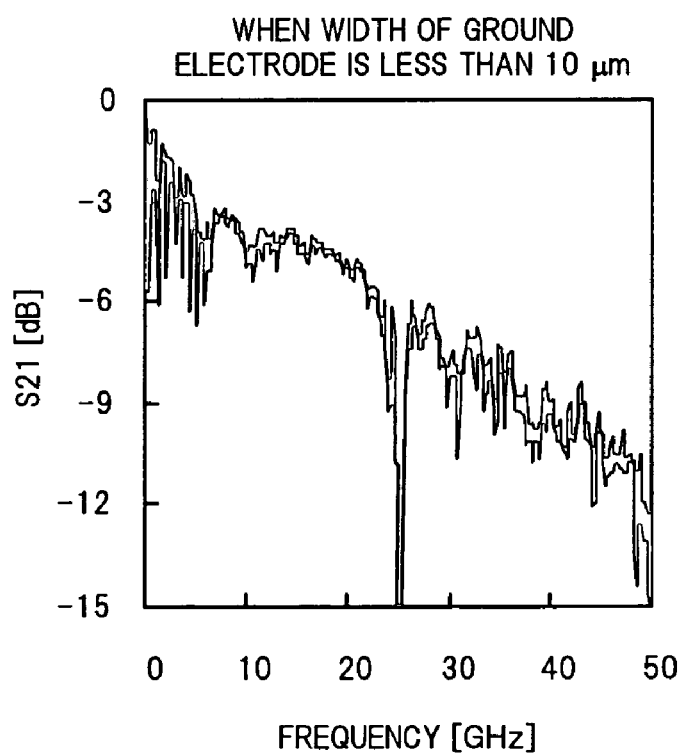

When the ground electrode 32 of the region 33 can be divided into two electrodes, if the width of the ground electrode 32 is less than 10 μm, for example, as indicated by a lower stage in FIG. 7, frequency characteristics (S21) are deteriorated. For this reason, the width of the ground electrode 32 is preferably set to be 10 μm or more to make it possible to obtain preferable frequency characteristics as indicated by an upper stage in FIG. 7.

As described in the first to third embodiments, when the optical modulator according to the present invention is used as an optical modulator of an RZ modulation method, electric signals given to the signal electrodes 31A and 31B may be the electric signal CLK corresponding to the clock or the electric signal DATA corresponding to the NRZ data. However, in the configuration of the present invention, the arrangements of the optical waveguides on the substrate 10 are not symmetrical, and the MZ type optical waveguide units 20A and 20B have different shapes. For this reason, it is more effective that electric signals to be given to the signal electrodes 31A and 31B can be appropriately selected depending on the modulation methods.

For example, as in a carrier-suppressed return to zero (CSRZ) modulation method, when an optical modulator on a clock side is operated by a double drive voltage (Vπ), it is desired that the optical modulator on the clock side is a low drive voltage. Therefore, when the present invention is applied to the CSRZ modulation method, an electrode length of the signal electrode 31A corresponding to the MZ type optical waveguide unit 20A on the input side is preferably made longer than an electrode length of the signal electrode 31B corresponding to the MZ type optical waveguide unit 20B on the output side to decrease a drive voltage, the electric signal CLK corresponding to the clock is preferably applied to the signal electrode 31A, and the electric signal DATA corresponding to the NRZ data is preferably applied to the signal electrode 31B.

Of the MZ type optical modulators on the clock side and the NRZ data side, the MZ type optical modulator on the NRZ data side is required to have a wide band. For this reason, a modulation band on the NRZ data side is preferably wider than a modulation band on the clock side. As a concrete method of widening a modulation band, for example, a method of making an electrode length of a signal electrode to which an electric signal DATA corresponding to the NRZ data is applied shorter than an electrode length of a signal electrode to which an electric signal CLK corresponding to a clock is applied is known. It is also effective that a distance (gap) between the signal electrode on the NRZ data side and a ground electrode is longer than that on the clock side.

Figure 8:
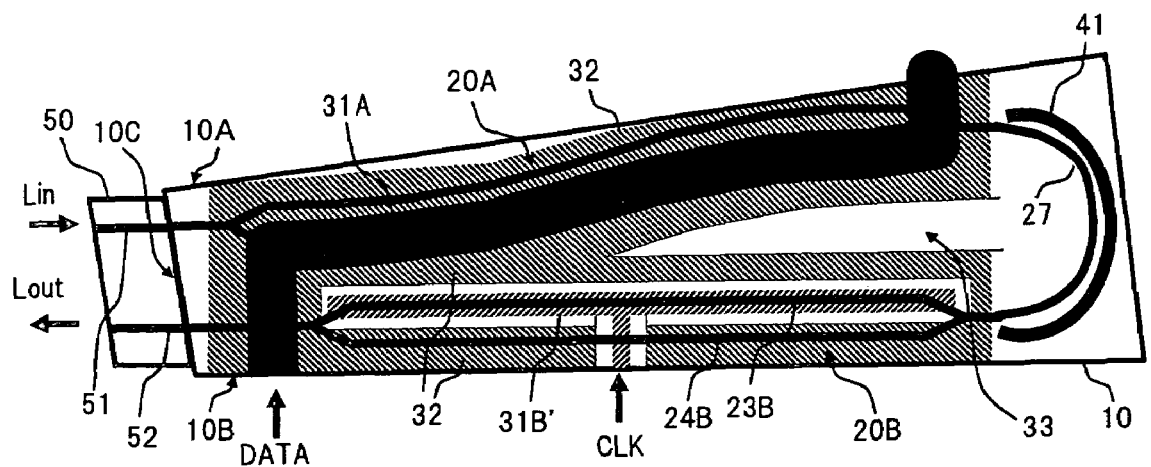
FIG. 8 is a plan view showing an application obtained by applying a resonance type configuration to an MZ type optical modulator on an output side in relation to the third embodiment.
Figure 9:
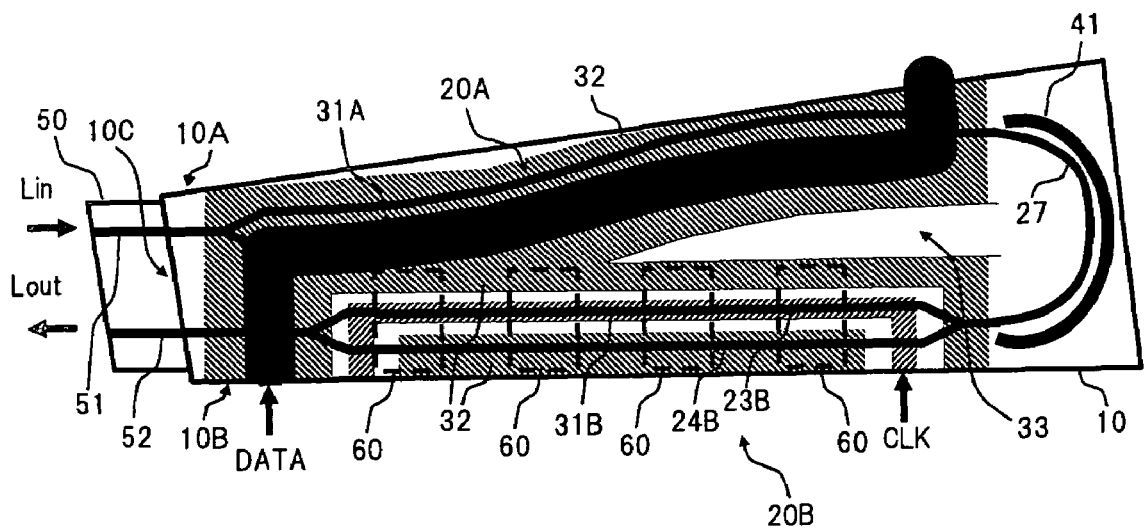
FIG. 9 is a plan view showing an application obtained by applying a traveling-wave type configuration subjected to pseudo phase matching to an MZ type optical modulator on the output side in relation to the third embodiment.
Figure 10:
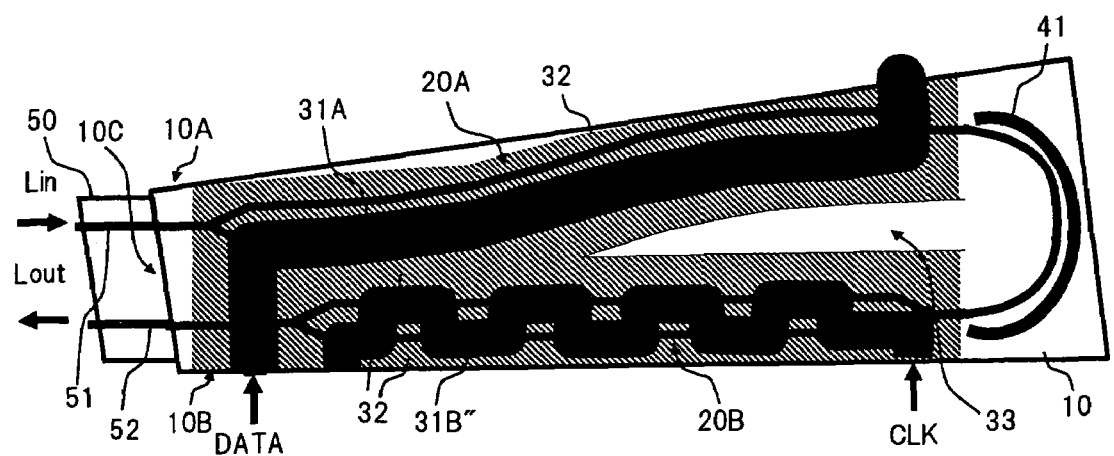
FIG. 10 is a plan view showing another application obtained by applying a traveling-wave type configuration subjected to pseudo phase matching to an MZ type optical modulator on the output side in relation to the third embodiment.

In addition, in the configuration of the third embodiment shown in FIG. 5, the electric signal CLK corresponding to the clock is applied to the signal electrode 31A on the input side, and the electric signal DATA corresponding to the NRZ data is applied to the signal electrode 31B on the output side. However, from the standpoint of easiness of driving, the electric signal DATA may be conveniently applied to the signal electrode 31A on the input side, and the electric signal CLK may be conveniently applied to the signal electrode 31B on the output side. In such a case, a device to decrease the drive voltage in the MZ type optical modulator on the output side is required. In order to decrease the drive voltage, a narrow-band optical modulator which can be driven by only a clock frequency is effective. FIGS. 8 to 10 show a concrete example of the narrow-band optical modulator.

The configuration shown in FIG. 8 is obtained such that, in the configuration according to the third embodiment shown in FIG. 5, in place of the traveling-wave signal electrode 31B corresponding to the MZ type optical waveguide unit 20B on the output side, a resonance signal electrode 31B' is arranged. The signal electrode 31B' includes a portion formed along the branch waveguide 23B and a feeder portion extending from an almost middle point to the side surface 10B of the substrate 10, and the length of the portion along the branch waveguide 23B is optimized depending on the clock frequency. In such a configuration, since the electric signal CLK applied to the signal electrode 31B' on the output side resonates at a clock frequency, the MZ type optical modulator on the output side can be operated at a low drive voltage.

In the configuration shown in FIG. 9, a plurality of polarization inversion regions 60 each obtained by inverting a polarization direction of the substrate 10 are formed along the branch waveguides 23B and 24B of the MZ type optical waveguide unit 20B. The lengths and the arrangement intervals of the polarization inverted regions 60 are determined depending on a clock frequency, so that a traveling-wave optical modulator subjected to pseudo phase matching is realized. Furthermore, in the configuration shown in FIG. 10, an electrode pattern is designed such that a signal electrode 31B" and a ground electrode 32 are alternately replaced with each other on the two branch waveguides 23B and 24B of the MZ type optical waveguide unit 20B on the output side, so that a traveling-wave type optical modulator subjected to pseudo phase matching is realized. Even in the traveling-wave type configuration subjected to pseudo phase matching, the MZ type optical modulator on the output side is driven by only a clock frequency, and a drive voltage can be decreased.

The first to third embodiments and applications related thereto explain the case in which both the two optical modulators connected in tandem are MZ type intensity modulators. However, the present invention is not limited to this configuration. Even though one or both of the two optical modulators are phase modulators, the same effects obtained in the embodiments described above can be obtained.

What is claimed is:

1. An optical modulator comprising:
a substrate having an electrooptic effect;
an optical input port and an optical output port arranged on the same end face of the substrate;
a first optical waveguide unit formed on the substrate and having one end connected to the optical input port;
a second optical waveguide unit formed on the substrate, at a location separated from the first optical waveguide, and having one end connected to optical output port;
a curved folded waveguide which is formed on the substrate and connects the other ends of the first and second optical waveguide units to each other;
a first signal electrode arranged along the first optical waveguide unit;
a second signal electrode arranged along the second optical waveguide unit; and
a ground electrode arranged with a distance to the first and second signal electrodes,
wherein a portion of the first signal electrode extending along a longitudinal direction of the first optical waveguide unit is obliquely arranged to a portion of the second electrode extending along a longitudinal direction of the second optical waveguide unit, the portion of the first signal electrode and the portion of the second signal electrode being arranged so as to not intersect one another;
a curvature radius of the curved folded waveguide is larger than a half of an interval between the optical input port and the optical output port; and
input portions of the first and second signal electrodes to which electric signals are applied are arranged at a side surface, closer to the optical output port than the optical input port, of opposing side surfaces of the substrate.

2. The optical modulator according to claim 1, wherein the shape of the substrate is rectangle, and
a distance from the side surface, close to the optical output port, of the opposing side surfaces of the substrate to the optical output port is shorter than a distance from the other side surface of the opposing side surfaces of the substrate to the optical input port.

3. The optical modulator according to claim 1, wherein a portion near an end portion of the first optical waveguide unit on the curved folded waveguide side is curved at a curvature radius larger than the curvature radius of the curved folded waveguide, and a bending angle of the curved folded waveguide is 180° or less.

4. The optical modulator according to claim 1, wherein a groove is formed in a radially outside part of the substrate along the curved folded waveguide.

5. The optical modulator according to claim 1, wherein a curvature radius of the curved folded waveguide is 1.5 mm or more.

6. The optical modulator according to claim 1, wherein a part near the end portion of the first optical waveguide unit on the optical input port side and a part near the end portion of the second optical waveguide unit on the optical output port side are almost parallel to each other.

7. The optical modulator according to claim 1, wherein the first optical waveguide unit is curved in an S shape.

8. The optical modulator according to claim 7, wherein a terminal portion of the first signal electrode opposing the input portion is arranged near a side surface, close to the optical input port, of the opposing side surfaces of the substrate, and an electrode pattern near the terminal portion is drawn to temporarily bear away from the side surface near the optical input port.

9. The optical modulator according to claim 8, wherein the first signal electrode has a bonding pad having a width increased near the terminal portion of the first signal electrode, and a length of the pad is 50 µm or more.

10. The optical modulator according to claim 1, wherein the substrate has a trapezoidal shape such that the end face on which the optical input port and the optical output port are located and an end face opposing the end face are almost parallel to each other, and an angle between the end faces and the side surface close to the optical input port is almost 90°.

11. The optical modulator according to claim 10, wherein the optical input port and the optical output port have obliquely cut end faces, respectively.

12. The optical modulator according to claim 10, wherein the substrate is formed such that an angle between the end face on which the optical input port and the optical output port are located and the side surface close to the optical input port is 90° or more.

13. The optical modulator according to claim 10, wherein the ground electrode is divided into a portion corresponding to the first signal electrode and a portion corresponding to the second signal electrode between the first and second optical waveguide units and in a region located near the curved folded waveguide.

14. The optical modulator according to claim 13, wherein the ground electrode has portions which correspond to the first and second signal electrodes and are equal to each other in width.

15. The optical modulator according to claim 14, wherein the widths of the portions of the ground electrode are 10 µm or more each.

16. The optical modulator according to claim 1, wherein a two-core fiber array is connected to the optical input port and the optical output port.

17. The optical modulator according to claim 16, wherein in the two-core fiber array, an optical fiber connected to the optical input port is a constant-polarization fiber, and an optical fiber connected to the optical output port is a single-mode fiber.

18. The optical modulator according to claim 1, wherein each of the first and second optical waveguide units has a Mach Zehnder interferometer in which light input to an input waveguide is branched into two, the branched lights are sent to a pair of branch waveguides, respectively, and the lights propagated through the branch waveguides are coupled by a coupling unit to output the coupled light from an output waveguide.

19. The optical modulator according to claim 18, wherein the first and second signal electrodes are formed on a branch waveguide, located inside the substrate, of the pair of branch waveguides of the first and second optical waveguide units.

20. The optical modulator according to claim 18, wherein an electric signal corresponding to NRZ data is applied to one signal electrode of the first and second signal electrodes, and an electric signal corresponding to a clock is applied to the other signal electrode, so that an RZ-modulated optical signal is output.

21. The optical modulator according to claim 20, wherein an electrode length of the first signal electrode is longer than an electrode length of the second signal electrode, the electric signal corresponding to the clock is applied to the first electrode, and the electric signal corresponding to the NRZ data is applied to the second signal electrode, so that an optical signal subjected to carrier-suppressed-return-to-zero modulation is output.

22. The optical modulator according to claim 20, comprising
a structure in which a modulation band in the optical waveguide unit driven depending on the electric signal corresponding to the NRZ data is wider than a modulation band in the optical waveguide unit driven depending on the electric signal corresponding to the clock.

23. The optical modulator according to claim 22, wherein an electrode length of a signal electrode to which the electric signal corresponding to the NRZ data is applied is shorter than an electrode length of a signal electrode to which the electric signal corresponding to the clock is applied.

24. The optical modulator according to claim 20, comprising
a structure in which,
when the electric signal corresponding to the NRZ data is applied to the first signal electrode and the electric signal corresponding to the clock is applied to the second signal electrode, the second optical waveguide unit can be driven depending on only a clock frequency component included in the electric signal.

25. The optical modulator according to claim 24, wherein the second signal electrode has a resonance configuration.

26. The optical modulator according to claim 24, wherein
at least one polarization inverted region obtained by inverting a polarization direction of the substrate is formed along the pair of branch waveguides of the second optical waveguide unit to obtain a traveling-wave type configuration subjected to pseudo phase matching.

27. The optical modulator according to claim 24, wherein
arrangements of the second signal electrode and the ground electrode on the pair of branch waveguides of the second optical waveguide unit are alternately replaced with each other to obtain a traveling-wave type configuration subjected to pseudo phase matching.

28. An optical modulator comprising:
a substrate having an electrooptic effect;
an optical input port and an optical output port arranged on the same end face of the substrate;
a first optical waveguide unit formed on the substrate and having one end connected to the optical input port;
a second optical waveguide unit formed on the substrate, at a location separated from the first optical waveguide unit, and having one end connected to the optical output port;
a first signal electrode arranged along the first optical waveguide unit;
a second signal electrode arranged along the second optical waveguide unit; and
a ground electrode arranged with a distance to the first and second signal electrodes, wherein
a portion of the first signal electrode extending along a longitudinal direction of the first optical waveguide unit is obliquely arranged to a portion of the second signal electrode extending along a longitudinal direction of the second optical waveguide unit, the portion of the first signal electrode and the portion of the second signal electrode being arranged so as to not intersect one another, and
input portions of the first and second signal electrodes to which electric signals are applied are arranged at a side surface, closer to the optical output port than the optical input port, of opposing side surfaces of the substrate.

* * * * *

UNITED STATES PATENT AND TRADEMARK OFFICE
CERTIFICATE OF CORRECTION

PATENT NO. : 7,471,853 B2  
APPLICATION NO. : 11/698202  
DATED : December 30, 2008  
INVENTOR(S) : Masaki Sugiyama Page 1 of 1

It is certified that error appears in the above-identified patent and that said Letters Patent is hereby corrected as shown below:

Column 11, Line 30, Claim 1 change "waveguide," to --waveguide unit,--.

Column 11, Line 31, Claim 1 change "to" to --to the--.

Column 11, Line 44, Claim 1 change "second" to --second signal--.

Signed and Sealed this

Seventeenth Day of March, 2009

JOHN DOLL  
*Acting Director of the United States Patent and Trademark Office*